A. Graves,
Potato Digger.
No. 76,438.    Patented Apr. 7, 1868.

Witnesses:
F. A. Morley
G. B. Jenny

Inventor:
Abrah Graves

United States Patent Office.

ALVAH GRAVES, OF MARCELLUS FALLS, NEW YORK.

Letters Patent No. 76,438, dated April 7, 1868.

IMPROVEMENT IN POTATO-DIGGERS.

The Schedule referred to in these Letters Patent and making part of the same.

TO ALL WHOM IT MAY CONCERN:

Be it known that I, ALVAH GRAVES, of Marcellus Falls, in the county of Onondaga, and State of New York, have invented a new and useful Improvement in Potato-Diggers; and I do hereby declare that the following is a full, clear, and exact description thereof, which will enable those skilled in the art to make and use the same, reference being had to the accompanying drawings, forming part of this specification, in which—

Similar letters of reference indicate like parts in all the figures.

Figure 1:
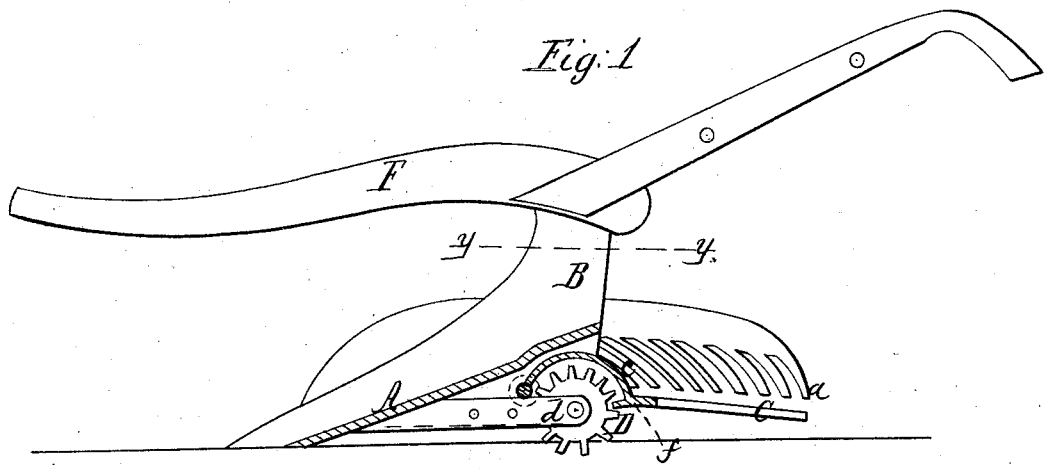
Figure 1 is a longitudinal section taken in the line $x$ $x$ in fig. 2.
Figure 2:
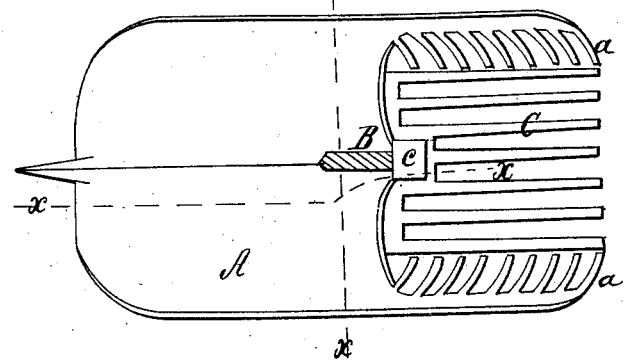
Figure 2 is a horizontal section taken in the line $y$ $y$ in fig. 1.
Figure 3:
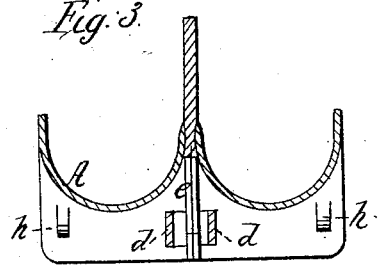
Figure 3 is a cross-section taken in the line $z$ $z$, fig. 2.

In the accompanying drawings, A is a shovel-plough, which is fitted to the beam F by a standard, B. To the rear end of the shovel is pivoted a riddle or screen, C, by means of pivots and ears, $a$ $a$, fig. 3. D is a toothed wheel, which is pivoted to the under rear side of the shovel A, by means of straps $d$ $d$, (figs. 1 and 3.) The forward part of the riddle has an arching cover or roof, $c$, to prevent dirt from falling upon the wheel D, and this cover occupies the A-shaped space $e$, below the standard B. A portion of the weight of the digger is supported by the serrated wheel D, and as the implement is drawn forward the teeth enter the ground, and cause the wheel to rotate, while the teeth on its upper side toss or actuate the riddle C, by coming in contact with a small projecting piece, $f$, of the riddle. And in this manner, as the wheel D is rotated, the teeth are constantly coming in contact with the projection $f$, and act as cams to toss the riddle C. As the digger is drawn forward, the dirt and potatoes run up the shovel, and over its rear end, on to the riddle, where the dirt is separated from the potatoes, and falls through the riddle, while the potatoes pass off of its rear end, and are left on the surface of the ground. The standard B may be forked, and one leg secured to each side of the shovel, instead of connecting with the shovel at its centre, as shown, so as to offer less obstruction for vines, &c., passing over the shovel. But with the standard in the centre, a larger wheel, D, can be used, as advantage is taken of the hollow space $e$ below the standard. The sides of the shovel are extended to the rear, and the lower edges of these sides are provided with a series of fingers, $a$ $a$, which prevent the unriddled dirt and potatoes from falling off at the sides of the riddle. By this means I obtain a very simple and inexpensive implement.

Having thus described my invention, what I claim as new, and desire to secure by Letters Patent, is—

1. I claim the serrated wheel D, when so constructed with relation to the riddle C, that the lower portions of its teeth engage with the ground, to propel the wheel, while the upper portions engage in tossing the riddle, substantially in the manner and for the purpose set forth.

2. I claim the shovel-plough A $a$ B F, hinged riddle C $c$, and serrated wheel D, all constructed, combined, and operating in the manner shown and for the purpose described.

The above specification of my invention signed by me, this 2d day of November, 1867.

ALVAH GRAVES.

Witnesses:
C. E. WARNER,
F. A. MORLEY.